United States Patent
Ding et al.

(10) Patent No.: US 9,489,557 B2
(45) Date of Patent: *Nov. 8, 2016

(54) DECODABLE INDICIA READING TERMINAL WITH OPTICAL FILTER

(71) Applicant: Hand Held Products, Inc., Fort Mill, SC (US)

(72) Inventors: Yiwu Ding, Skaneateles, NY (US); Chen Feng, Snohomish, WA (US); Ynjiun Paul Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,798

(22) Filed: Dec. 28, 2015

(65) Prior Publication Data

US 2016/0110578 A1    Apr. 21, 2016

Related U.S. Application Data

(63) Continuation of application No. 14/159,603, filed on Jan. 21, 2014, now Pat. No. 9,224,025, which is a continuation of application No. 13/170,104, filed on Jun. 27, 2011, now Pat. No. 8,636,215.

(51) Int. Cl.
  *G06K 7/10* (2006.01)
  *G06K 7/12* (2006.01)

(52) U.S. Cl.
  CPC ....... *G06K 7/10831* (2013.01); *G06K 7/10821* (2013.01); *G06K 7/12* (2013.01)

(58) Field of Classification Search
  CPC .................... G06K 7/10831; G06K 7/10821; G06K 7/12
  See application file for complete search history.

(56) References Cited

U.S. PATENT DOCUMENTS

| | | |
|---|---|---|
| 5,019,699 A | 5/1991 | Koenck |
| 5,406,062 A | 4/1995 | Hasegawa et al. |
| 5,504,367 A | 4/1996 | Arackellian et al. |

(Continued)

FOREIGN PATENT DOCUMENTS

| | | |
|---|---|---|
| CN | 101069190 A | 11/2007 |
| CN | 102982301 A | 3/2013 |
| EP | 2541464 A1 | 1/2013 |
| EP | 2541463 A1 | 2/2013 |
| WO | 2006098954 A2 | 9/2006 |
| WO | 2011088590 A1 | 7/2011 |

OTHER PUBLICATIONS

First Chinese Office Action in related CN Application No. 201210282459.6, Dated Mar. 31, 2016, 25 pages [English Machine Translation provided].

(Continued)

*Primary Examiner* — Kristy A Haupt
(74) *Attorney, Agent, or Firm* — Additon, Higgins & Pendleton, P.A.

(57) ABSTRACT

A decodable indicia reading terminal can comprise a housing including a housing window, a multiple pixel image sensor disposed within the housing, an imaging lens configured to focus an image of decodable indicia on the image sensor, an optical bandpass filter disposed in an optical path of light incident on the image sensor, an analog-to-digital (A/D) converter configured to convert an analog signal read out of the image sensor into a digital signal representative of the analog signal, and processor configured to output a decoded message data corresponding to the decodable indicia by processing the digital signal.

20 Claims, 6 Drawing Sheets

(56) References Cited

U.S. PATENT DOCUMENTS

| | | | |
|---|---|---|---|
| 5,541,419 A | 7/1996 | Arackellian |
| 5,572,006 A | 11/1996 | Wang et al. |
| 5,576,529 A | 11/1996 | Koenck et al. |
| 5,591,955 A | 1/1997 | Laser |
| 5,627,359 A | 5/1997 | Amundsen et al. |
| 5,646,390 A | 7/1997 | Wang et al. |
| 5,648,650 A | 7/1997 | Sugifune et al. |
| 5,701,001 A | 12/1997 | Sugifune et al. |
| 5,756,981 A | 5/1998 | Roustaei et al. |
| 5,784,102 A | 7/1998 | Hussey et al. |
| 5,789,731 A | 8/1998 | Amundsen et al. |
| 5,815,200 A | 9/1998 | Ju et al. |
| 5,877,487 A | 3/1999 | Tani et al. |
| 5,886,338 A | 3/1999 | Arackellian et al. |
| 5,969,323 A | 10/1999 | Gurevich et al. |
| 6,010,070 A | 1/2000 | Mizuochi et al. |
| 6,029,894 A | 2/2000 | Amundsen et al. |
| 6,209,789 B1 | 4/2001 | Amundsen et al. |
| 6,230,975 B1 | 5/2001 | Colley et al. |
| 6,254,003 B1 | 7/2001 | Pettinelli et al. |
| 6,283,374 B1 | 9/2001 | Fantone et al. |
| 6,347,163 B2 | 2/2002 | Roustaei |
| 6,412,700 B1 | 7/2002 | Blake et al. |
| 6,669,093 B1 | 12/2003 | Meyerson et al. |
| 6,695,209 B1 | 2/2004 | La |
| 6,749,120 B2 | 6/2004 | Hung et al. |
| 6,832,725 B2 | 12/2004 | Gardiner et al. |
| 6,877,661 B2 | 4/2005 | Webb et al. |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,185,817 B2 | 3/2007 | Zhu et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Muni |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,564,548 B2 | 7/2009 | Flanders et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,712,667 B2 | 5/2010 | Laser |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,913,912 B2 | 3/2011 | Do et al. |
| 7,918,398 B2 | 4/2011 | Li et al. |
| 7,967,211 B2 | 6/2011 | Challa et al. |
| 7,995,178 B2 | 8/2011 | Suguro et al. |
| 8,074,887 B2 | 12/2011 | Havens et al. |
| 8,636,215 B2 | 1/2014 | Ding et al. |
| 8,640,958 B2 | 2/2014 | Lu et al. |
| 8,640,960 B2 | 2/2014 | Wang et al. |
| 8,733,660 B2 | 5/2014 | Wang et al. |
| 8,978,985 B2 | 3/2015 | Wang |
| 9,224,025 B2 * | 12/2015 | Ding ................ G06K 7/10821 |
| 2001/0000615 A1 | 5/2001 | Amundsen et al. |
| 2001/0006150 A1 | 7/2001 | Taniike et al. |
| 2001/0006151 A1 | 7/2001 | Leerkamp et al. |
| 2001/0006152 A1 | 7/2001 | Henderson et al. |
| 2001/0006153 A1 | 7/2001 | Merrell et al. |
| 2001/0006154 A1 | 7/2001 | Krug et al. |
| 2001/0006156 A1 | 7/2001 | Pereira et al. |
| 2001/0006157 A1 | 7/2001 | Ogasawara |
| 2001/0006158 A1 | 7/2001 | Ho et al. |
| 2001/0006159 A1 | 7/2001 | Happ et al. |
| 2001/0027995 A1 | 10/2001 | Patel et al. |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0049261 A1 | 3/2006 | Stadtler |
| 2006/0113386 A1 | 6/2006 | Olmstead |
| 2006/0145057 A1 | 7/2006 | Kim |
| 2006/0163355 A1 | 7/2006 | Olmstead et al. |
| 2006/0202036 A1 | 9/2006 | Wang et al. |
| 2006/0274171 A1 | 12/2006 | Wang |
| 2007/0119949 A1 | 5/2007 | Hattersley et al. |
| 2007/0131775 A1 | 6/2007 | Zhu et al. |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0023556 A1 | 1/2008 | Vinogradov et al. |
| 2008/0223933 A1 | 9/2008 | Smith |
| 2008/0252066 A1 | 10/2008 | Rapoport et al. |
| 2008/0277476 A1 | 11/2008 | Kotlarsky et al. |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2009/0159685 A1 | 6/2009 | Shi et al. |
| 2009/0159686 A1 | 6/2009 | Taylor et al. |
| 2009/0242635 A1 | 10/2009 | Meier et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0078482 A1 | 4/2010 | Bradford |
| 2010/0090007 A1 | 4/2010 | Wang et al. |
| 2010/0108769 A1 | 5/2010 | Wang et al. |
| 2010/0147956 A1 | 6/2010 | Wang et al. |
| 2010/0155483 A1 | 6/2010 | Craig et al. |
| 2011/0049245 A1 | 3/2011 | Wang |
| 2011/0163165 A1 | 7/2011 | Liu et al. |
| 2011/0163166 A1 | 7/2011 | Wang |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinburg et al. |
| 2012/0153022 A1 | 6/2012 | Havens et al. |
| 2012/0193429 A1 | 8/2012 | Van Volkinburg et al. |
| 2012/0298755 A1 | 11/2012 | Lu et al. |
| 2012/0325912 A1 | 12/2012 | Wang et al. |
| 2013/0001312 A1 | 1/2013 | Kearney et al. |
| 2013/0146665 A1 | 6/2013 | Havens et al. |
| 2013/0248604 A1 | 9/2013 | Coyle |
| 2014/0204257 A1 | 7/2014 | Wang |
| 2014/0246494 A1 | 9/2014 | Wang |
| 2016/0173801 A1 | 6/2016 | Wang |

OTHER PUBLICATIONS

Oct. 25, 2012 European Search Report in European Application No. 12173704.3, [Issued as EP2541464], 4 pages. Previously submitted in Parent Application.

(56) References Cited

OTHER PUBLICATIONS

Oct. 24, 2012, European Search Report in European Application No. 12172823.2, [Issued as EP 2541463], 3 pages. Previously submitted in Parent Application.

Nov. 7, 2012, European Office Action [Communication Pursuant to Article 94(3) EPC] in European Application No. 12173704.3, [Issued as EP 2541464], 5 pages. Previously submitted in Parent Application.

Nov. 7, 2012, European Office Action [Communication Pursuant to Article 94(3) EPC] in European Application No. 12172823.2, [Issued as EP 2541463], 4 pages. Previously submitted in Parent Application.

May 21, 2013, European Office Action [Communication Pursuant to Article 94(3) EPC] in European Application No. 12172823.2, [Issued as EP 2541463], 4 pages. Previously submitted in Parent Application.

Apr. 10, 2013, European Office Action [Communication Pursuant to Article 94(3) EPC] in European Application No. 12173704.3, [Issued as EP 2541464], 4 pages. Previously submitted in Parent Application.

Motorola, "Creating Quality Bar Codes for Your Mobile Application", White Paper, Dec. 2010 available at http://motorola.com/web/Business/Products/Bar%20Code%20Scanning/Documents/Mobile%20Barcodes%20White%20Paper.pdf. Previously submitted in Parent Application.

* cited by examiner

DECODABLE INDICIA READING TERMINAL WITH OPTICAL FILTER

CROSS-REFERENCE TO RELATED APPLICATIONS

The present application claims the benefit of U.S. patent application Ser. No. 14/159,603 for a Decodable Indicia Reading Terminal with Optical Filter filed Jan. 21, 2014 (and published May 15, 2014 as U.S. Patent Publication No. 2014/0131445), now U.S. Pat. No. 9,224,025, which claims the benefit of U.S. patent application Ser. No. 13/170,104 for a Decodable Indicia Reading Terminal with Optical Filter filed Jun. 27, 2011 (and published Dec. 27, 2012 as U.S. Patent Publication No. 2012/0325911), now U.S. Pat. No. 8,636,215. U.S. patent application Ser. No. 13/309,195 for an *Optical Filter for Image and Barcode Scanning* filed Dec. 1, 2011 (and published Dec. 27, 2012 as U.S. Patent Publication No. 2012/0325912), now U.S. Pat. No. 8,640,960, also claims the benefit of U.S. patent application Ser. No. 13/170,104. Each of the foregoing patent applications, patent publications, and patents is hereby incorporated by reference in its entirety.

FIELD OF THE INVENTION

This invention relates generally to decodable indicia reading terminals and, more specifically, to optical indicia reading terminals comprising an optical filter.

BACKGROUND

The use of optical indicia, such as bar code symbols, for product and article identification is well known in the art. Decodable indicia reading terminals are available in multiple varieties. For example, minimally featured bar code reading terminals devoid of a keyboard and display are common in point of sale applications. Decodable indicia reading terminals devoid of a keyboard and display are available in the recognizable gun style form factor having a handle and trigger button (trigger) that can be actuated by an index finger. Decodable indicia reading terminals having keyboards and displays are also available. Keyboards and display equipped decodable indicia reading terminals are commonly used in shipping and warehouse applications, and are available in form factors incorporating a display and keyboard. In a keyboard and display equipped decodable indicia reading terminal, a trigger button for actuating the output of decoded messages is typically provided in such locations as to enable actuation by a thumb of an operator. Keyboard and display equipped decodable indicia reading terminals are available in a form in which the keyboard and display are commonly provided by a display having an associated touch panel. Decodable indicia reading terminals in a form devoid of a keyboard and display or in a keyboard and display equipped form are commonly used in a variety of data collection applications including point of sale applications, shipping applications, warehousing applications, security check point applications, and patient care applications. Decodable indicia reading terminals are also available in a presentation reader form factor. Such terminals can be mounted at a checkout station. Some bar code reading terminals are adapted to read bar code symbols including one or more of one-dimensional (1D) bar codes, and two-dimensional (2D) bar codes.

One common type of scan engine found in hand-held and retail scanners is the digital imager, which includes 1D (linear) imagers and 2D (area) imagers. Digital imagers typically utilize a lens to focus the image of the bar code onto a multiple pixel image sensor, which often is provided by a CMOS-based or CCD-based image sensor that converts light signals into electric signals. A light source such as light emitting diodes (LEDs) simultaneously illuminate all of the bars and spaces of a bar code symbol in order to capture an image for recognition and decoding purposes.

SUMMARY

In one embodiment, there is provided a decodable indicia reading terminal which can comprise a housing including a housing window, a multiple pixel image sensor disposed within the housing, an imaging lens configured to focus an image of decodable indicia on the image sensor, an optical bandpass filter disposed in an optical path of light incident on the image sensor, an analog-to-digital (A/D) converter configured to convert an analog signal read out of the image sensor into a digital signal representative of the analog signal, and a processor configured to output a decoded message data corresponding to the decodable indicia by processing the digital signal. The optical bandpass filter can be configured to pass light of two or more selected ranges of wavelengths and to attenuate light of wavelengths outside of said two or more selected ranges.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
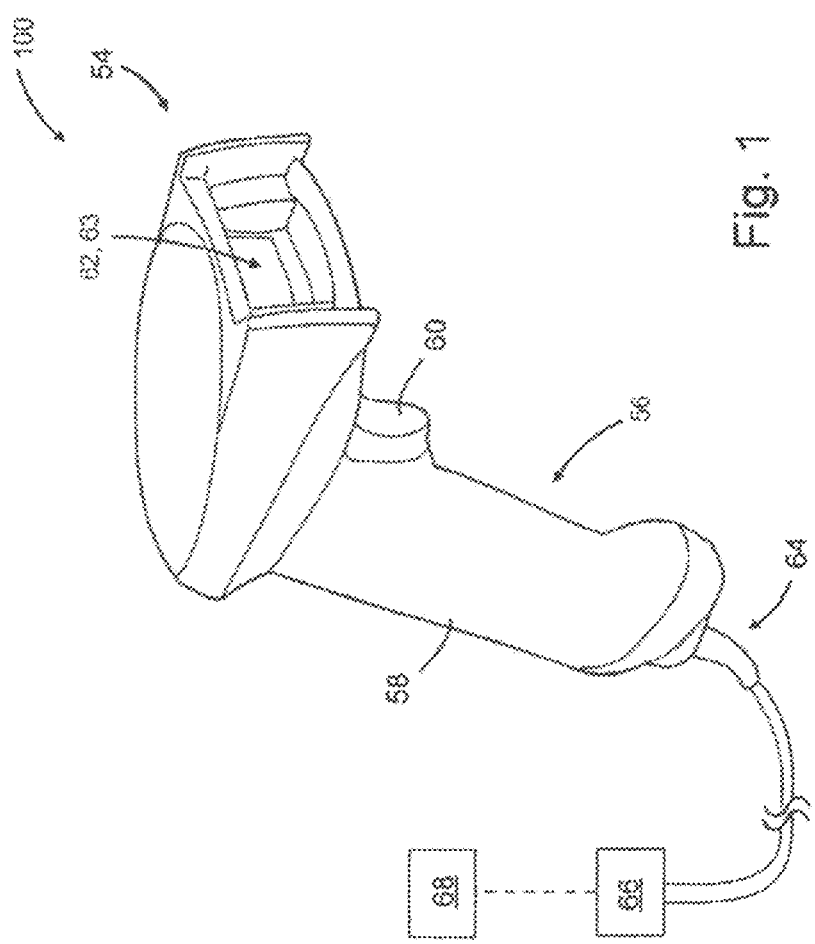
FIGS. 1-2 schematically illustrate embodiments of a decodable indicia reading terminal.

In an illustrative embodiment, shown in FIG. 1, there is provided an optical indicia reading terminal 100 including a housing 52 comprising a head portion 54 and a handle portion 56, the latter further comprising a hand grip 58 and a trigger 60. The trigger 60 can be used to initiate signals for activating frame readout and/or certain decoding processes. Other components of the optical indicia reading terminal 100 can be disposed within the housing 52. For example, an image sensor 62 can be disposed in the head portion 54 behind a housing window 63. The image sensor 62 can be configured to output an electrical signal representative of light incident on the image sensor.

The optical indicia reading terminal 100 can further comprise an I/O interface which in the illustrative embodiment of FIG. 1 can be communicatively coupled to a wired connection 66. The I/O interface can be used to communicatively couple the optical indicia reading terminal 100 to a companion device 68 such as a register and/or peripheral data capture devices in a point-of-sale (POS) application. Other configurations of the I/O interface may utilize wireless communication technology and/or contact-type features that do not require wires and/or wired connection 66. In certain applications of the indicia reading terminal 100 for example, the companion device 68 may be provided by a docking station with corresponding mating contacts and/or connectors that are useful to exchange power and data, including image data captured by the imaging module 62.

Although not incorporated in the illustrative embodiment of FIG. 1, the optical indicia reading terminal 100 can also comprise a number of peripheral devices, including a display for displaying such information as image frames captured by the terminal, a keyboard, and a pointing device.

The optical indicia reading terminal 100 can be used, for example, for bar code reading and decoding in POS and other applications. A skilled artisan would appreciate the fact that other uses of optical indicia reading terminal 100 are within the scope of this disclosure.

A product having decodable indicia can be scanned by the optical indicia reading terminal 100. As used herein, "decodable indicia" is intended to denote a representation of a message, such as the representation in a bar code symbology of a character string comprising alphanumeric and non-alphanumeric characters. Decodable indicia can be used to convey information, such as the identification of the source and the model of a product, for example in a UPC bar code that comprises twelve encoded symbol characters representing numerical digits. The optical indicia reading terminal can be configured to output a decoded message data corresponding to the decodable indicia.

Figure 2:
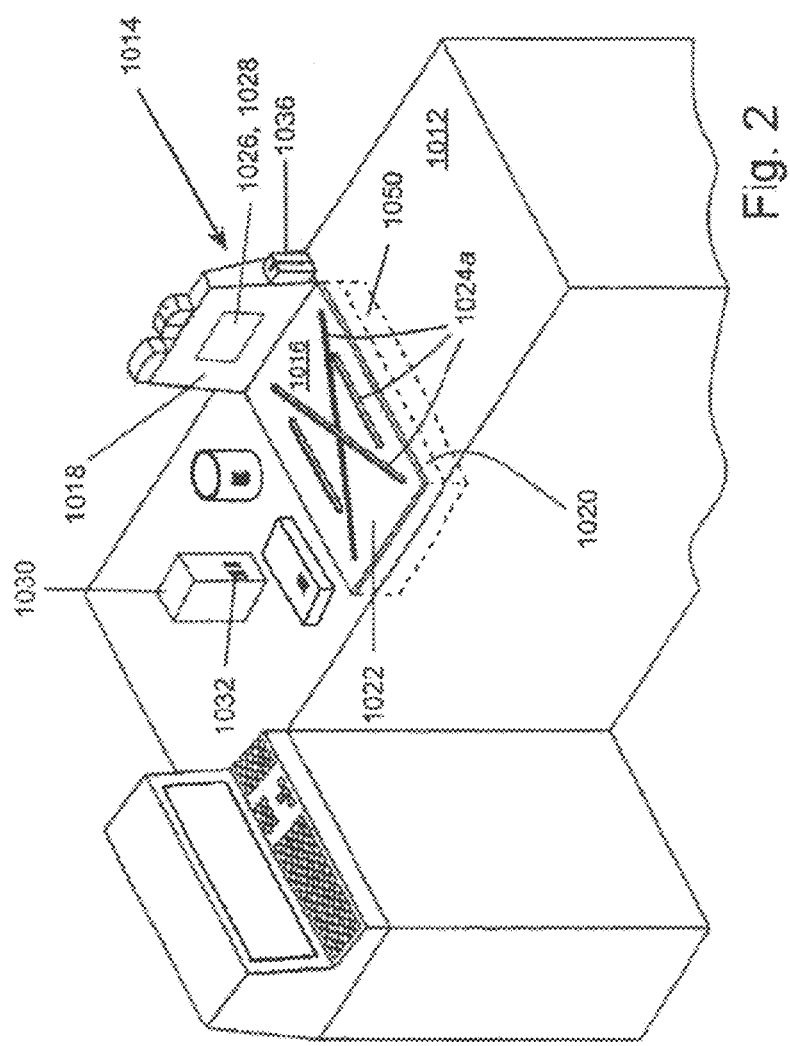

While FIG. 1 illustrates a hand held housing, a skilled artisan would appreciate the fact that other types and form factors of terminal housings are within the scope of this disclosure. For example, in one embodiment schematically shown in FIG. 2, the decodable indicia reading terminal can be incorporated into a POS workstation with a presentation housing. The workstation 1010 can include a horizontal countertop 1012 for placement of products to be scanned. A bioptic scanner 1014 mounted within the countertop 1012 can include a first housing portion 1016 and a second housing portion 1018 which can project from one end of the first housing portion in a substantially orthogonal manner. In one embodiment, the first housing portion 1016 can comprise a laser-based indicia scanning terminal and the second housing portion 1018 can comprise an imager-based terminal. The countertop 1012 can include an optically transparent (e.g., glass) horizontal-scanning window 1020 mounted flush with the checkout counter, covered by an imaging window protection plate 1022 which can be provided with a pattern of apertures 1024a. The second housing portion 1018 can further include a vertical-scanning window 1026 behind which an imager-based indicia reading terminal 1028 can be housed. A skilled artisan would appreciate the fact that other ways of disposing the scanners and scanning windows are within the scope of this disclosure.

In POS and many other applications, one of the key challenges for imaging devices is the requirement of intense illumination. The magnitude of illumination intensity is directly correlated to the motion tolerance performance of the bar code scanning/imaging device. Device's user satisfaction depends on high motion tolerance demonstrated by the device, while requiring the lowest possible perceived illumination intensity.

In order to reduce the perceived illumination intensity, the housing window of a bar code scanning/imaging device can be configured to only pass the light in the red spectrum region. The benefits of such approach would include more stable exposure and more balanced images. However, a red housing window would attenuate the light in other (non-red) spectrum regions, thus producing a monochrome image and potentially causing loss of image content. A clear housing window, on the other hand, would pass all the color spectrum unfiltered but will lead to a more intense perceived illumination.

Figure 3:
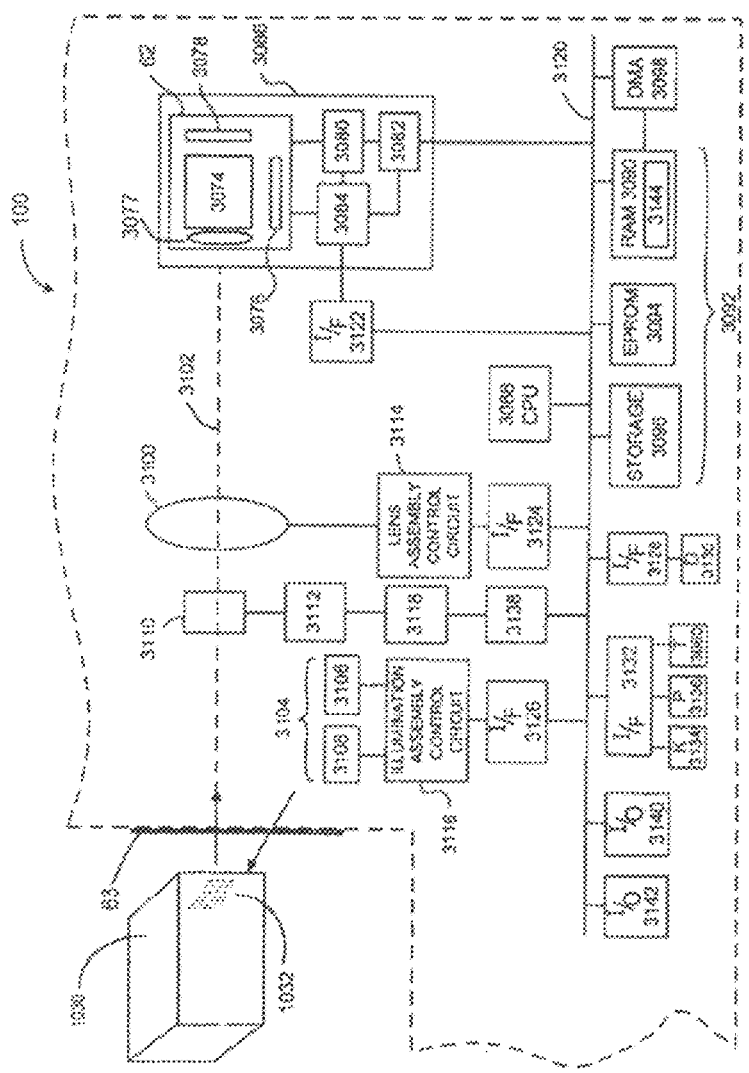
FIG. 3 is a component diagram of one embodiment of a decodable indicia reading terminal.

In order to overcome the above described challenge, the optical indicia reading terminal can in one embodiment comprise an optical bandpass filter disposed in an optical path of light incident on the image sensor and configured to balance the color content and the perceived illumination. In one embodiment, the optical bandpass filter can be configured to pass light of one or more selected ranges of wavelengths and to attenuate light of wavelengths outside of the selected ranges. In another embodiment, the optical indicia reading terminal can comprise a multi-band optical bandpass filter that can be configured to pass light of two or more selected ranges of wavelengths and to attenuate light of wavelengths outside of the selected ranges. An optical indicia reading terminal having a multi-band optical bandpass filter can be used for both monochrome and color applications, FIG. 3 illustrates a block diagram of one embodiment of an optical indicia reading terminal. The optical indicia reading terminal 100 can comprise a multiple pixel image sensor 62, which in one embodiment can be provided by a charge-coupled device (CCD) image sensor. In another embodiment, the image sensor 62 can be provided by a complementary metal-oxide-semiconductor (CMOS) image sensor. A skilled artisan would appreciate the fact that other types of image sensors are within the scope of this disclosure.

The image sensor 62 can comprise a multiple pixel image sensor array 3074 having pixels arranged in rows and columns of pixels, column circuitry 3076, and row circuitry 3078. Associated with the image sensor 62 can be amplifier circuitry 3080, and an analog-to-digital (A/D) converter 3082 which can be configured to convert image information in the form of analog signals read out of multiple pixel image sensor array 3074 into image information in the form of digital signals. Also associated with the image sensor 62 can be timing and control circuit 3084 for use in controlling, e.g., the exposure period of image sensor 62, and/or gain applied to the amplifier 3080. The noted circuit components 62, 3080, 3082, and 3084 can be packaged into a common image sensor integrated circuit 3086. In one example, image sensor integrated circuit 3086 can be provided by an MT9V022 mage sensor integrated circuit available from Micron Technology, Inc. In another example, image sensor integrated circuit 3086 can incorporate a Bayer pattern filler.

In operation, image signals can be read out of image sensor 62, converted and stored into one or more memories such as 3090. A memory 3092 can include RAM 3090, a nonvolatile memory such as EPROM 3094, and a storage memory device 3096 such as may be provided by a flash memory or a hard drive memory.

In one embodiment, the optical indicia reading terminal 100 can include a processor 3088 which can be configured to read out image data stored in memory 3092 and subject such image data to various image processing algorithms. In one embodiment, the processor 3088 can be configured to output a decoded message data corresponding to scanned decodable indicia by processing a digital signal representative of an analog signal read out of the image sensor 62.

Optical indicia reading terminal 100 can also include a direct memory access unit (DMA) 3098 for routing image information read out from image sensor 62 that has been subject to conversion to RAM 3090. In another embodiment, the optical indicia reading terminal 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 62 and RAM 3090 are within the scope of this disclosure.

The optical indicia reading terminal 100 can also include an imaging lens assembly 3100 for focusing an image of the decodable indicia 1032 onto image sensor 62. Imaging light rays can be transmitted about an optical axis 3102. The optical indicia reading terminal 100 can also include an illumination assembly 3104 comprising one or more illumination light source banks 3106 comprising one or more LEDS for generating an illumination pattern substantially corresponding to the field of view of the image sensor 62.

In one embodiment, each illumination LED can be formed by multiple dies having different spectral characteristics. In another embodiment, one or more illumination LEDs can have different spectral characteristics. Hence, the spectrum of the light irradiated upon the optical indicia can be formed by multiple different dies with different spectral characteristics on a single LED, or by multiple LEDs with different spectral characteristics. In a further aspect, the spectrum of the light irradiated upon the indicia can vary at different area of the indicia.

In one embodiment, the optical indicia reading terminal 100 can also include an aiming pattern light source bank 3108 comprising one or more LEDs for generating an aiming pattern. In operation, the terminal 100 can be oriented relatively to the product 3030 by an operator of the terminal 100 in such manner that the aiming pattern is projected on the encoded symbol character 3032.

In another aspect, the optical indicia reading terminal can further comprise an optical bandpass filter 3110 disposed in an optical pass of light incident on the image sensor. The optical bandpass filter 3110 can be configured to pass light of one or more selected ranges of wavelengths and to attenuate light of wavelengths outside of the selected ranges. In one embodiment, the optical bandpass filter 3110 can be configured to pass light of two or more selected ranges of wavelengths and to attenuate light of wavelengths outside of the selected ranges.

In the illustrative embodiment of FIG. 3, the optical bandpass filter 3110 can be disposed between the housing window 63 and the imaging lens assembly 3100. In another embodiment, the filter module 3110 can be disposed, for example, but not limited to, between the imaging lens assembly 3100 and the image sensor 62, at a surface of the imaging lens assembly 3100, or at a surface of the micro-lens 3077 of the image sensor 62. In a yet another embodiment, the filter module 3110 can be built-in, for example, but not limited to, into the imaging lens assembly 3100, into the micro-lens 3077 of the image sensor 62, or into the housing window 63.

In one embodiment, the optical bandpass filter 3110 can be manufactured using one or more multi-layer coatings which can be applied to an optically transparent substrate.

In another embodiment, the optical bandpass filter 3110 can be manufactured using periodic structures which can be formed by a single material or multiple different materials with repeating features in one or more dimensions. A skilled artisan would appreciate the fact that other technologies of manufacturing optical bandpass filter are within the scope of this disclosure.

In a further aspect, the optical bandpass filter 3110 can be described by the following characteristics:

Center Wavelength (CWL) is the wavelength at the center of the passband;

Full Width at Half Maximum (FWHM) is the bandwidth at 50% of the maximum transmission;

peak Transmission (T) is the wavelength of maximum transmission; and blocking range is the spectral region in which the filter does not transmit.

Figure 4:
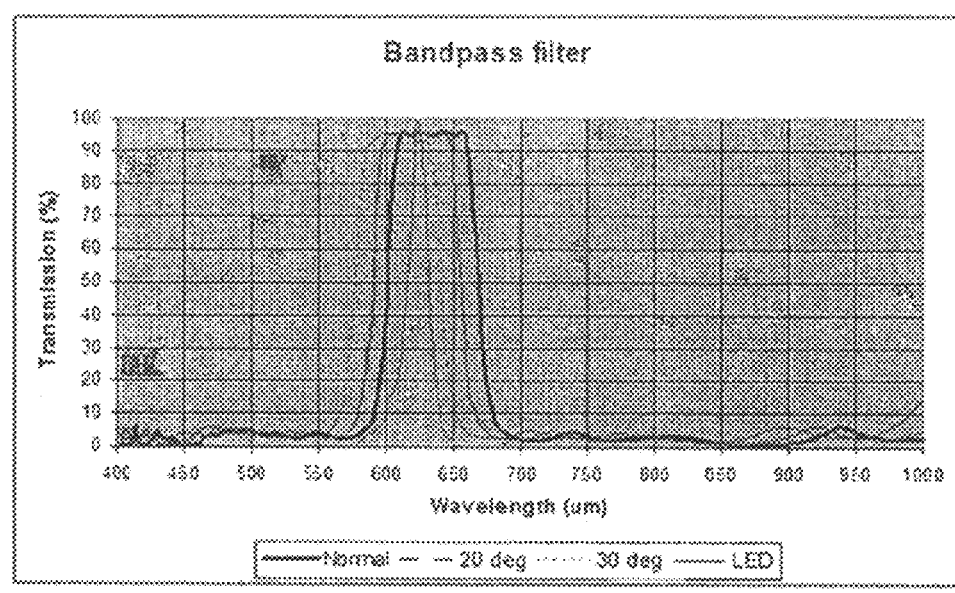
FIGS. 4-6 schematically illustrate transmission diagrams of optical bandpass filters employed by decodable indicia reading terminal according to several illustrative embodiments.

In one embodiment, the CWL of the optical bandpass filter 3110 can be configured to match the illumination light spectrum. In one illustrative embodiment shown in FIG. 4, the optical bandpass filter can have a CWL equal to 635 nm, and FWHM equal to 65 nm to accommodate the ray angle as well as LED variation (for amber LED with peak wavelength of 624 nm, dominant wavelength of 617 nm, tolerance +7/−5 nm).

Figure 5:
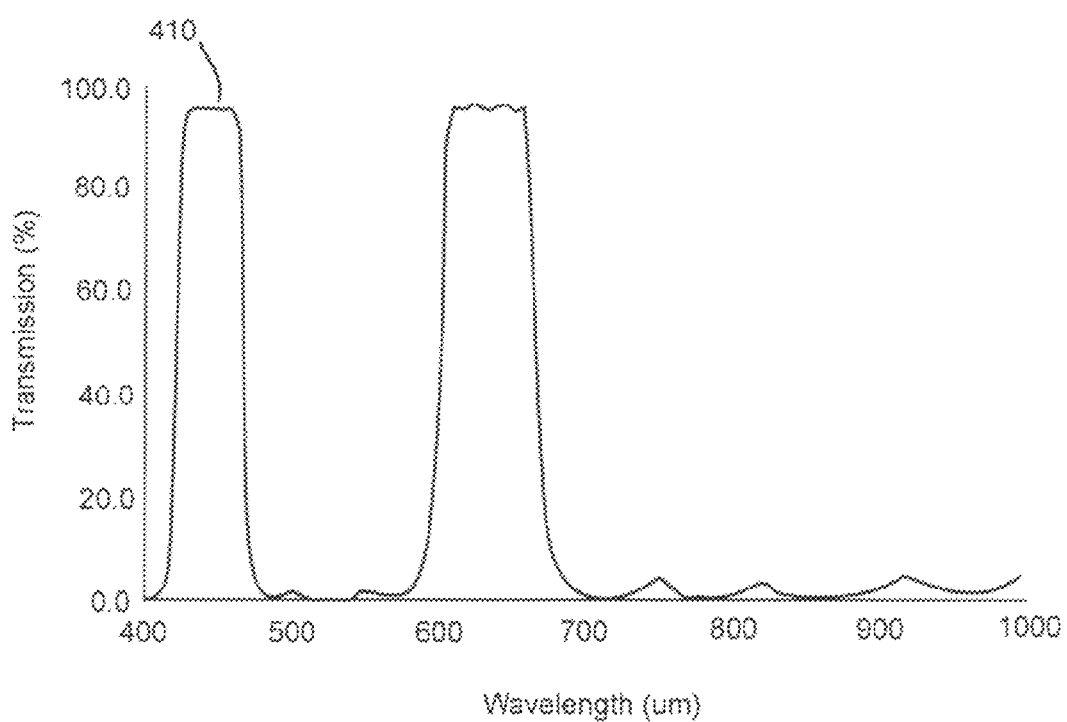

In another embodiment, the optical bandpass filter can include an additional passband 410 which can be configured, for example, to match a blue peak of the white light, as shown in FIG. 5. In another embodiment, the optical bandpass filter can include an additional passband configured to match the backlight emitting by a screen of a portable communication device, for example, but not limited to, PDA or cellular phone.

Figure 6:
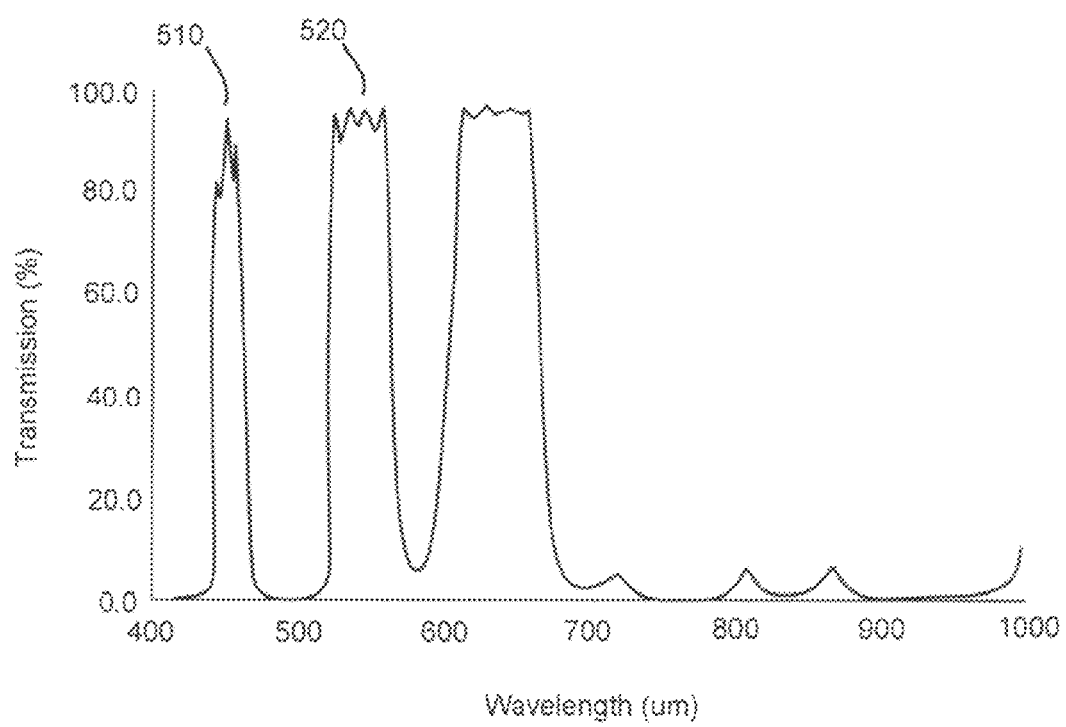

In a yet another embodiment, the optical bandpass filter can include two additional passbands 510, 520 which can be configured, for example, to match a blue and a green peak of the white light, as shown in FIG. 6.

In a further aspect, the optical indicia reading terminal 100 can include various control circuits. Lens assembly 3100 can be controlled with use of lens assembly control circuit 3114 and the illumination assembly 3104 comprising illumination pattern light source bank 3106 and aiming pattern light source bank 3108 can be controlled with use of illumination assembly control circuit 3116. Filter module 3110 can be controlled with use of a filter module control circuit 3118, which can be coupled to the actuator assembly 3112. Lens assembly control circuit 3114 can send signals to lens assembly 3100, e.g., for changing a focal length and/or a best focus distance of lens assembly 3100. Illumination assembly control circuit 3116 can send signals to illumination pattern light source bank 3106, e.g., for changing a level of illumination output.

In a further aspect, the optical indicia reading terminal 100 can include various interface circuits for coupling several of the peripheral devices to system address/data bus (system bus) bus 3120, for communication with the processor 3088 also coupled to system bus 3120. The optical indicia reading terminal 100 can include interface circuit 3122 for coupling image sensor timing and control circuit 3084 to system bus 3120, interface circuit 3124 for coupling the lens assembly control circuit 3114 to system bus 3120, interface circuit 3126 for coupling the illumination assembly control circuit 3116 to system bus 3120, interface circuit 3128 for coupling a display 3130 to system bus 3120, interface circuit 3132 for coupling a keyboard 3134, a pointing device 3136, and trigger 3060 to system bus 3120, and interface circuit 3138 for coupling the filter module control circuit 3118 to system bus 3120.

In a further aspect, the optical indicia reading terminal 100 can include one or more I/O interfaces 3140, 3142 for providing communication with external devices (e.g., a cash register server, a store server, an inventory facility server, a local area network base station, a cellular base station). I/O interfaces 3140, 3142 can be interfaces of any combination of known computer interfaces, e.g., Ethernet (IEEE 802.3), USB, IEEE 802.11, Bluetooth, CDMA, and GSM, and may couple with processors, such as interface microcontrollers, and memories to carry out some or all the functions described herein.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of systems and methods that are described herein follows:

A1 A decodable indicia reading terminal comprising:
a housing including a housing window;
a multiple pixel image sensor disposed within said housing;
an imaging lens configured to focus an image of decodable indicia on said image sensor;
an optical bandpass filter disposed in an optical path of light incident on said image sensor, said optical bandpass filter configured to pass light of two or more selected ranges of wavelengths and to attenuate light of wavelengths outside of said two or more selected ranges;
an analog-to-digital (A/D) converter configured to convert an analog signal read out of said image sensor into a digital signal representative of said analog signal, said analog signal representative of light incident on said image sensor; and
a processor configured to output a decoded message data corresponding to said decodable indicia by processing said digital signal.

A2. The optical indicia reading terminal of A1 configured to acquire images in a monochrome mode and in a color mode.

A3. The optical indicia reading terminal of A1, wherein said optical bandpass filter is disposed between said housing window and said imaging lens.

A4. The optical indicia reading terminal of A1, wherein said optical bandpass filter is disposed said imaging lens assembly and said image sensor.

A5. The optical indicia reading terminal of A1, wherein said optical bandpass filter is disposed at a surface of said imaging lens assembly.

A6. The optical indicia reading terminal of A1, wherein said multiple pixel image sensor comprises a micro-lens; and
wherein said optical bandpass filter is disposed at a surface of said micro-lens.

A7. The optical indicia reading terminal of A1, wherein said optical bandpass filter is built-in into said imaging lens assembly.

A8. The optical indicia reading terminal of A1, wherein said multiple pixel image sensor comprises a micro-lens; and
wherein said optical bandpass filter is built-in into said micro-lens.

A9. The optical indicia reading terminal of A1, wherein said optical bandpass filter is built-in into said housing window.

A10. The optical indicia reading terminal of A1, wherein said filter comprises a multi-layer coating.

A11. The optical indicia reading terminal of A1, wherein said filter comprises periodic structures.

A12. The optical indicia reading terminal of A1, further comprising one or more illumination LEDs configured to illuminate a substrate bearing decodable indicia.

A13. The optical indicia reading terminal of A1, further comprising one or more illumination LEDs having different spectral characteristics, said one or more illumination LEDs configured to illuminate a substrate bearing decodable indicia.

A14. The optical indicia reading terminal of A1, further comprising one or more illumination LEDs, each illumination LED of said one or more illumination LEDs comprising one or more dies having different spectral characteristics;
wherein said one or more illumination LEDs are configured to illuminate a substrate bearing decodable indicia.

A15. The optical indicia reading terminal of A1, further comprising one or more illumination LEDs configured to illuminate a substrate bearing decodable indicia, by emitting light having an illumination light spectrum;
wherein said illumination light spectrum varies at different areas of said substrate.

A16. The optical indicia reading terminal of A1, further comprising one or more illumination LEDs configured to illuminate said substrate, by emitting light having an illumination light spectrum;
wherein a center wavelength of said optical bandpass filter is configured to match said illumination light spectrum.

A17. The optical indicia reading terminal of A1, wherein said optical bandpass filter includes a passband configured to match a backlight emitted by a portable communication device.

A18. The optical indicia reading terminal of A1, wherein said housing is provided by a hand held housing.

A19. The optical indicia reading terminal of A1, wherein said housing is provided by a point-of-sale workstation housing.

A20. The optical indicia reading terminal of A1 wherein said housing is provided by a presentation housing.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will he understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:
1. An apparatus comprising:
an image sensor configured to output a signal representative of incident on the image sensor via an optical path;

an optical bandpass filter disposed in the image sensor's optical path so that light incident on the image sensor passes through the optical bandpass filter and is subject to bandpass filtering by the optical bandpass filter in common wavelength ranges, the optical bandpass filter configured for passing of two or more selected wavelength ranges and for attenuating light having a wavelength outside the two or more selected wavelength ranges.

2. The apparatus of claim 1, wherein the apparatus is configured for acquiring images in a monochrome mode and in a color mode.

3. The apparatus of claim 1, wherein:
the image sensor comprises a micro-lens; and
the optical bandpass filter is disposed at a surface of the micro-lens.

4. The apparatus of claim 1, wherein:
the image sensor comprises a micro-lens; and
the optical bandpass filter is built into the micro-lens.

5. The apparatus of claim 1, comprising a window, wherein the optical bandpass filter is built into the window.

6. The apparatus of claim 1, wherein the optical bandpass filter comprises a multi-layer coating.

7. The apparatus of claim 1, wherein the optical bandpass filter comprises periodic structures.

8. The apparatus of claim 1, wherein the optical bandpass filter includes a passband configured to match a backlight emitted by a portable communication device.

9. The apparatus of claim 1, comprising a hand held housing.

10. The apparatus of claim 1, comprising a presentation housing.

11. An apparatus comprising:
an image sensor configured to output a signal representative of light incident on the image sensor via an optical path;
a housing window disposed in the image sensor's optical path;
an imaging lens for focusing light onto the image sensor, the imaging lens being disposed in the image sensor's optical path between the housing window and the image sensor;
an optical bandpass filter disposed in the image sensor's optical path so that light incident on the image sensor passes through the optical bandpass filter and is subject to bandpass filtering by the optical bandpass filter in common wavelength ranges, the optical bandpass filter configured for passing light of two or more selected wavelength ranges and for attenuating light having a wavelength outside the two or more selected wavelength ranges.

12. The apparatus of claim 11, wherein the optical bandpass filter is disposed between the housing window and the imaging lens.

13. The apparatus of claim ii, wherein the optical bandpass filter is disposed between the imaging lens and the image sensor.

14. The apparatus of claim 11, wherein the optical bandpass filter is disposed at a surface of the imaging lens.

15. The apparatus of claim wherein the optical bandpass filter is built into the imaging lens.

16. An apparatus comprising:
an image sensor having afield of view, the image sensor being configured to output a signal representative of light incident on the image sensor via an optical path;
an optical bandpass filter disposed in the image sensor's optical path so that light incident on the image sensor passes through the optical bandpass filter and is subject to bandpass filtering by the optical bandpass filter in common wavelength ranges, the optical bandpass filter configured for passing light of two or more selected wavelength ranges and for attenuating light having a wavelength outside the two or more selected wavelength ranges;
an illumination assembly for generating an illumination pattern substantially corresponding to the field of view of the image sensor.

17. The apparatus of claim 16, wherein the illumination assembly comprises two or more illumination LEDs, each of the two or more illumination LEDs having different spectral characteristics.

18. The apparatus of claim 16, wherein the illumination assembly comprises two or more illumination LEDs, each of the two or more illumination LEDs comprising dies having different spectral characteristics.

19. The apparatus of claim 16, wherein the illumination assembly comprises an illumination LED for illuminating a substrate bearing decodable indicia by emitting light having an illumination spectrum that varies at different areas of the substrate.

20. The apparatus of claim 6, wherein the illumination assembly comprises an illumination LED for emitting light having an illumination spectrum that matches a selected wavelength range of the optical bandpass filter.

* * * * *